United States Patent [19]

Moddel et al.

[11] Patent Number: 5,615,029

[45] Date of Patent: Mar. 25, 1997

[54] ELECTRO-OPTIC WEDGE STRUCTURE FOR BEAM STEERING AND METHOD OF MANUFACTURE

[75] Inventors: Garret Moddel, Boulder, Colo.; John R. Wootton; Gary Waldman, both of St. Louis, Mo.; David L. Holder, St. Charles, Mo.

[73] Assignee: Electronics & Space Corp., St. Louis, Mo.

[21] Appl. No.: 400,647

[22] Filed: Mar. 8, 1995

[51] Int. Cl.$^6$ ............................................. G02F 1/1335
[52] U.S. Cl. ............................................. 349/84; 349/202
[58] Field of Search ........................... 359/62, 72, 93, 359/94, 95

[56] References Cited

U.S. PATENT DOCUMENTS

| | | | |
|---|---|---|---|
| 4,190,330 | 2/1980 | Berreman | 359/94 |
| 4,729,641 | 3/1988 | Matsuoka et al. | 359/94 |
| 4,850,682 | 7/1989 | Gerritsen | 359/94 |
| 4,941,735 | 7/1990 | Moddel et al. | 359/72 |
| 5,151,814 | 8/1992 | Grinberg et al. | 359/94 |

FOREIGN PATENT DOCUMENTS 63-101818  5/1988  Japan ..................................... 359/94

OTHER PUBLICATIONS

Haertling, "PLZT Electrooptic Materials and Applications—A Review," Ferroelectrics, 1987, vol. 75, pp. 25–55.
Konfort et al., "Phase–only Modulation with Twisted Nematic Liquid –Crystal Spatial Light Modulators," Optical Society of America, Mar. 1988, vol. 13, No. 3.
Tatebayashi, et al., "Electro–optic Variable Focal–length Lens Using PLZT Ceramic," Applied Optics, Dec. 1991, vol. 30, No. 34.
Ondris-Crawford, et al., "The Phase of the Future," The Physics Teacher, Sep. 1992, vol. 30.
McManamon et al., "Applications Look at the Use of Liquid Crystal Writable Gratings for Steering Passive Radiation," Optical Engineering, Nov. 1993, vol. 32, No. 11.
Love et al., "Liquid Crystal Prisms for Tip–Tilt Adaptive Optics," Optics Letters, Jan. 1994, pp. 1170–1172.
Osbond, "A Cermanic Scatter Mode Light Shutter," Plessey Research and Technology Review, circa 1994, pp. 89–94.

Primary Examiner—William L. Sikes
Assistant Examiner—James A. Dudek
Attorney, Agent, or Firm—Senniger, Powers, Leavitt & Roedel

[57] ABSTRACT

An apparatus for steering a beam of light. A volume of electro-optic, light transmissive material has a predetermined geometric shape, such as a wedge, and is positioned to intersect the beam of light so that the beam of light is directed into the material. The material has a first surface on which the beam of light is incident and a second surface opposite the first surface, the first and second surfaces defining a portion of the material therebetween having a thickness which varies with the beam of light passing through the portion of the material. A voltage source applies a potential difference across the portion of the material. A control circuit varies the magnitude of the potential difference applied to the portion of the material. As a result, the beam of light is deflected by an angle which is a function of the varying thickness of the portion of the material and the refractive index of the portion of the material as determined by the magnitude of the potential difference.

18 Claims, 3 Drawing Sheets

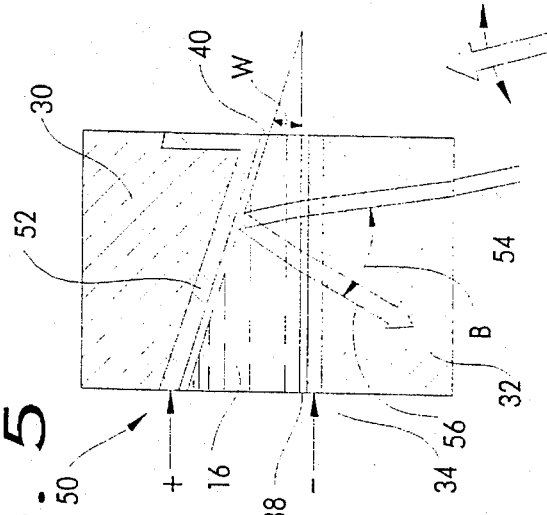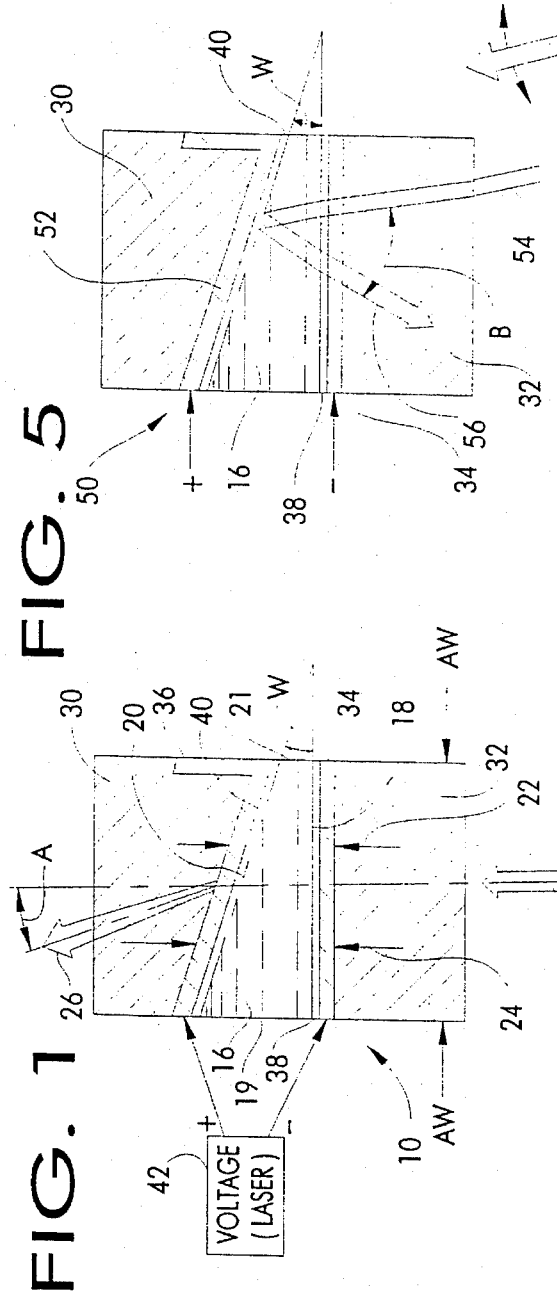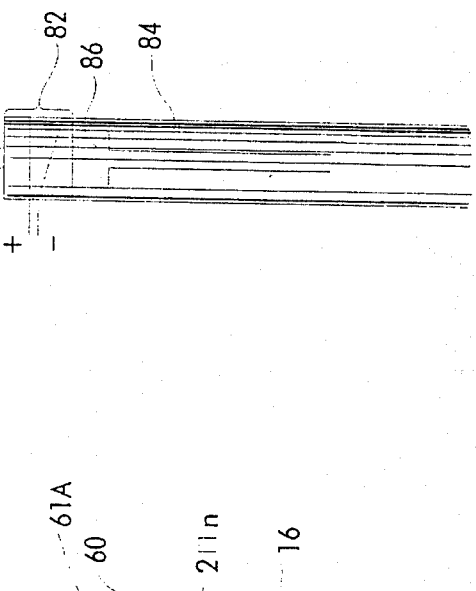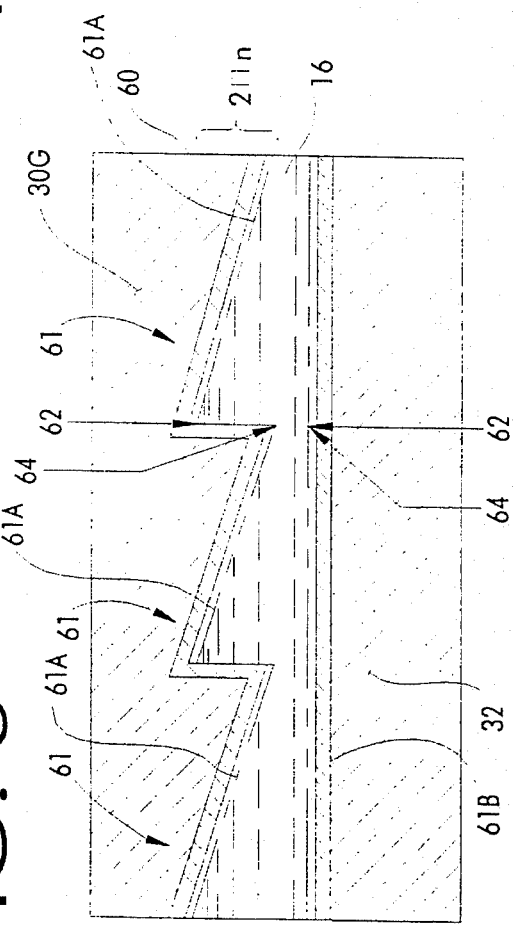

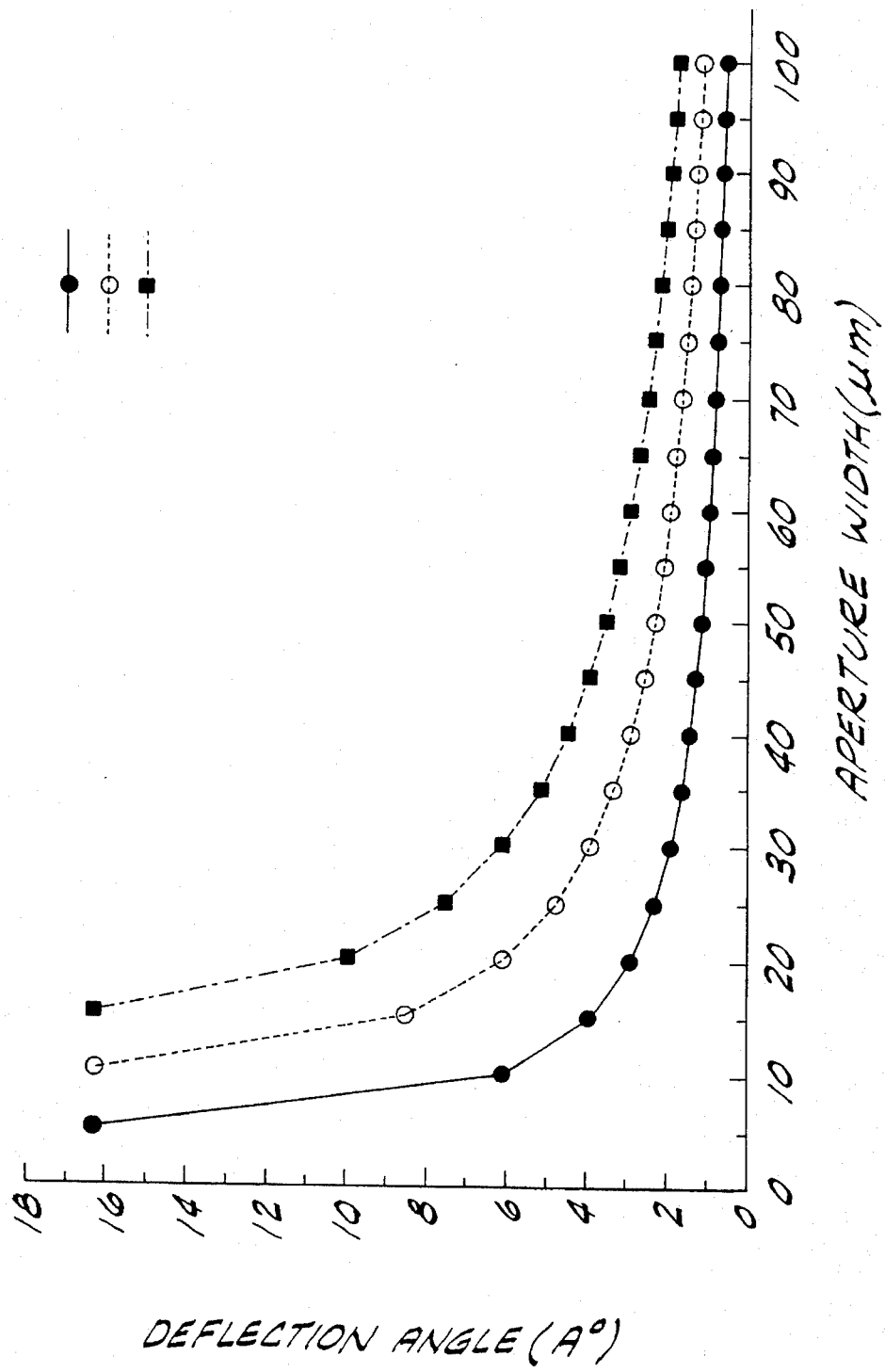

ELECTRO-OPTIC WEDGE STRUCTURE FOR BEAM STEERING AND METHOD OF MANUFACTURE

BACKGROUND OF THE INVENTION

1. Field of the Invention

The invention relates generally to a device and method for steering a beam of light and, in particular, a wedge of electro-optic material having a variable refractive index causing beams of light passing through the wedge to be deflected by an angle dependent upon the refractive index.

2. Description of the Prior Art

A beam of light may be steered or deflected by diffracting the beam off a refractive index grating imposed upon a dielectric medium. The pitch and phase depth of the grating determines the diffraction angle, and the phase depth of the grating determines the diffraction efficiency. This technique is generally used in acousto-optic modulators and striped liquid crystal spatial light modulators. Although such diffraction is somewhat effective, it has the disadvantage of providing a low diffraction efficiency. In particular, the maximum efficiency is about 40% in the first order. In addition, diffraction into high orders must be blocked and such diffraction often causes high chromatic dispersion which restricts the use of such systems to narrow wavelength bands. In addition, such systems require highly complex drive electronics to vary the pitch for different steering angles.

One solution to the problem is the use of phase active liquid crystals trapped between optical flats to dynamically create optical wedges and lenses. Such devices are disclosed in co-pending, co-assigned U.S. patent application Ser. No. 08/192,589, filed Feb. 7, 1994, now abandoned titled Phase Active Diffractive Optics; Ser. No. 08/192,588, filed Feb. 7, 1994, now abandoned titled Phase Active Diffractive Optical Method; and Ser. No. 08/192,656, filed Feb. 7, 1994, now abandoned titled Phase Active Diffractive Device, the entire disclosures of which are incorporated herein by reference. Using principles of diffraction, a liquid crystal is spatially controlled to provide beam steering. These devices exploit the variable phase characteristics of the liquid crystal under the influence of different electrical fields. Various liquid crystals (e.g., nematic liquid crystals) exhibit birefringent properties. Therefore, these devices take advantage of the property of spatially controlling the liquid crystal to dynamically yield different optical devices, such as a lens or a wedge.

In addition, these devices may spatially address individual portions of the liquid crystal at high resolution in order to effect a change in its refractive index. For example, in order to address the liquid crystal in one dimension only, it is necessary to address about 50 line pairs/mm or 100 addresses per mm. For a 25 mm aperture (which is a reasonably small aperture), there would be 2,500 addresses. If the wedge angle is changed at a frequency of 100 hz, this results in $2.5 \times 10^5$ addresses per second. In order to address the liquid crystal in two dimensions, there would be $625 \times 10^6$ addresses per second. As a result, the control or the addressing of the liquid crystal may create a bottleneck.

SUMMARY OF THE INVENTION

It is an object of the invention to provide a monolithic, non-mechanical beam deflector of wedge shape having a drive which is extremely simple and having a deflection angle which is a function of only a single drive voltage amplitude applied to the wedge. It is another object of this invention to circumvent the disadvantages of grating reflectors. In particular, it is an object of this invention to provide an electro-optic beam steering wedge having a diffraction efficiency on the order of unity (for polarized light). It is another object to provide such a wedge which reduces or eliminates higher order diffraction. It is another object to provide such a wedge in which chromatic dispersion is reduced, and limited by dispersion in the refractive index of the liquid crystal.

The invention comprises an apparatus for steering a beam of light. A volume, such as a wedge, of electro-optic, light transmissive material having a predetermined geometric shape is positioned to intersect the beam of light so that the beam of light is directed into the material. The material has a first surface on which the beam of light is incident and a second surface opposite the first surface. The first and second surfaces define a portion of the material therebetween having a thickness which varies, the beam of light passing through the portion of the material. A voltage source applies a potential difference across the portion of the material. A control circuit varies the magnitude of the potential difference applied to the portion of the material. As a result, the beam of light is deflected by an angle which is a function of the varying thickness of the portion of the material and the refractive index of the portion of the material as determined by the magnitude of the potential difference.

The invention also comprises a method of manufacturing an apparatus for steering a beam of light in response to a variable potential difference. The method comprises the following steps. First and second substrates are provided. A surface of each substrate is coated with one or more selected materials. The coating is buffed to create a selected pattern. The substrates are positioned so that their coated surfaces face each other and so that the substrates define a portion therebetween, such as a wedge, having a thickness which varies. A liquid crystal material is introduced between the supported substrates by capillary action. The liquid crystal material is cured and means for applying a variable potential difference across the portion of varying thickness is affixed to the cured liquid crystal material.

Other objects and features will be in part apparent and in part pointed out hereinafter.

BRIEF DESCRIPTION OF THE DRAWINGS

FIG. 1 is a cross-sectional diagram of one preferred embodiment of a wedge spatial light modulator according to the invention including a liquid crystal substrate having transparent conductors on either side thereof.

FIG. 3 is a graph illustrating the relationship between the deflection angle in degrees along the y axis and the aperture width in microns (μm) along the x axis of three wedges of the invention having a maximum thickness of 10 μm, 20 μm and 30 μm, each having a refractive index of n=1.5 and a liquid crystal birefringence of Δn=0.15 which is the maximum change in the refractive index of the medium as a result of application of the electric field created by the potential difference to the wedges.

FIG. 5 is a cross-sectional diagram of another preferred embodiment of a wedge of the invention including a liquid crystal substrate having a transparent conductor on one side thereof and a reflective conductor on the opposing side thereof.

FIG. 6 is a cross-sectional diagram of another preferred embodiment of the invention in the form of a multi-wedge structure having transparent conductors on either side thereof.

FIG. 7 is a side elevation of an optical fiber in combination with a wedge device of the invention.

Corresponding reference characters indicate corresponding parts throughout the drawings.

DETAILED DESCRIPTION OF THE PREFERRED EMBODIMENTS

Figure 2:
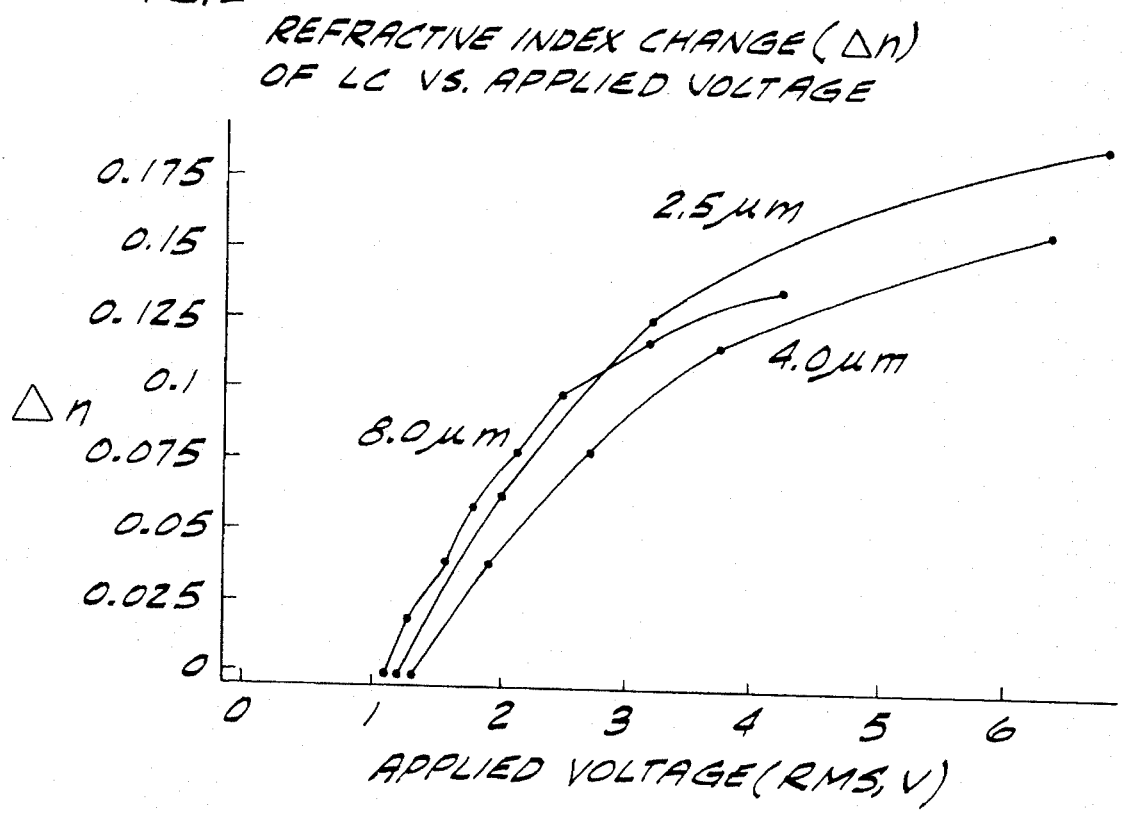
FIG. 2 is a graph illustrating the relationship between the refractive index of a liquid crystal along the y axis and the applied voltage along the x axis, for crystal of 2.5 μm, 4.0 μm and 8.0 μm in thickness.

As shown in FIG. 1, a transmission mode apparatus 10 according to the invention steers a beam of light 12 at an angle A relative to an axis 14 along which the beam of light was initially travelling. A volume 16 of an electro-optic, light transmissive material, such as a nematic liquid crystal, has a predetermined geometric shape such as a wedge as illustrated in FIG. 1. The volume 16 is positioned to intersect the beam of light 12 so that the beam of light is directed into the volume. The volume 16 forms the wedge such that it has a first surface 18 on which and through which the beam of light is incident and such that it has a second surface 20, opposite the first surface, through which the beam emerges. The first surface 18 is a first substantially planar surface, the second surface 20 is a second substantially planar surface non-parallel with the first substantially planar surface 18 and the wedge has sides 19, 21 interconnecting the first and second substantially planar surfaces and defining an aperture width AW therebetween. The first surface 18 and the second surface 20 define a portion of the volume 16 therebetween having a thickness which varies. For example, the thickness of the volume 16 at position 22 is less than the thickness at position 24. As a result, the beam of light 12 passes through the portion of the material between positions 22 and 24 having this varying thickness.

In the preferred embodiment illustrated in FIG. 1, the volume 16 of electro-optic material is bounded by two optical flats or glass substrates 30 and 32 which have been coated with a transparent conductor 34, 36. Each conductor is coated with an alignment layer 38, 40 so that the layers 38, 40 are between the conductors 34, 36 and the surfaces 18, 20. Since the substrates 30 and 32 have non-parallel surfaces therebetween, the volume 16 forms a wedge shape having a tapered thickness which decreases from left to right.

As shown in FIG. 1, volume 16 has a wedge shape in one dimension. Without subjecting the volume 16 to a potential difference, its wedge shape causes the beam 12 to deflect through an initial angle. In accordance with the invention, this initial deflection angle can be changed by subjecting the electro-optic volume 16 to a potential difference which changes its index of refraction. For example, a potential difference applied to the wedge which increases the index of refraction of the volume 16 would result an increase of the initial deflection angle. In particular, a potential difference applied to the electro-optic volume 16 will cause the deflection angle to vary. By varying the potential difference between the surfaces 18, 20, the refractive index of the portion of the volume 16 also varies. These variations deflect the incident beam of light 12 to create a deflected beam 26 at an angle A with respect to axis 14. By varying the magnitude of the potential difference only, the apparatus 10 can steer the incident beam 12 through various beam steer angles A. The device 10 steers in one axis and the control is reduced to one axis per address irrespective of the aperture size. This represents a considerable reduction in the number of control parameters as compared to the devices described in the above-noted patent applications.

The change in refractive index is a function of magnitude of the applied voltage, not magnitude of the applied field. This is shown in FIG. 2, in which the measured change in refractive index is plotted as a function of applied voltage for three liquid crystal thicknesses: 2.5 µm, 4.0 µm and 8.0 µm. The three curves of FIG. 2 are very close to each other and show no trend of a thickness dependence. The small variations in the shape and position of the curves are probably due to uncontrolled variables in the cell fabrication. Therefore, the path length times the change in refractive index varies as a function of the (horizontal) position along the wedge leading to a variation in deflection angle with voltage.

In one preferred embodiment of the invention, the electro-optic volume 16 may be a liquid crystal and particularly a nematic liquid crystal aligned such that the crystal molecules and oriented parallel (homogeneous) to the substrates 30, 32 when no voltage is applied. This is accomplished by the alignment layers 38 and 40. As the voltage is applied and increased, the liquid crystal molecules rotate, as a function of voltage, to a perpendicular (homeotropic) orientation relative to the substrates 30, 32, decreasing the effective refractive index of the liquid crystal material through which the light passes. This results in a decreasing deflection angle of the transmitted light beam.

The alignment layers 38, 40 align the molecules of the liquid crystal material to be substantially uniformly oriented relative to the first and second surfaces 18, respectively, when no potential difference is applied across the portion 22–24 of the liquid crystal material 16. Each alignment layer 38, 40 enables proper optical orientation of the liquid crystal material 16 so that the potential difference applied across the portion of the liquid crystal material causes the molecules to rotate and change the refractive index. If the material 16 comprises a nematic liquid crystal material, the alignment layers 38, 40 align the molecules of the nematic liquid crystal material to be substantially uniformly parallel to the first and second surfaces 38, 40, respectively, when no potential difference is applied across the portion between positions 22 and 24 of the liquid crystal material 16. As a result, each alignment layer 38, 40 provides homogeneous alignment which enables proper optical positioning of the nematic liquid crystal material 16 when the potential difference is applied across the portion of the nematic liquid crystal material. If the material 16 comprises a nematic liquid crystal material, the molecules may also be aligned substantially uniformly perpendicular to the first and second surfaces 38, 40, respectively, when no potential difference is applied across the portion of the liquid crystal material. As a result, each alignment layer 38, 40 provides homeotropic alignment which enables proper optical position of the liquid crystal material when the potential difference is applied across the portion of the liquid crystal material. As noted above with regard to FIG. 2, the change in refractive index is a function of the magnitude of the applied voltage. If a thickness dependence is found in the change in the refractive index for a particular liquid crystal/alignment layer combination, it may be compensated for by bowing one of the substrates such that the wedge is bowed.

Figure 4:
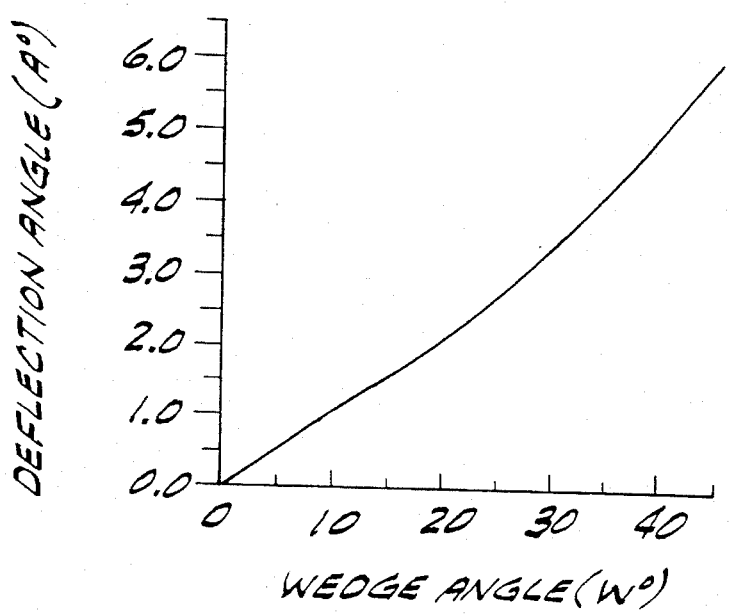
FIG. 4 is a graph illustrating the relationship between the maximum deflection angle in degrees along the y axis and the wedge angle w in degrees along the x axis of the wedge of the invention.

The shape of the deflected beam 26 as illustrated in FIG. 1 has been exaggerated to illustrate that the deflection angle A varies with varying thickness of the volume 16. For example, the portion of the incident beam 12 which is at position 22 is deflected to a greater extent than the portion of incident beam 12 which is at position 24. This is because the path length at position 22 is less than the path length at position 24 so that the refractive index times the path length is greater at position 24 than it is at position 22. FIG. 3 illustrates the variation of the deflection angle (A°) versus the aperture width AW for apertures having a maximum thickness of 10 um, 20 um, and 30 um. FIG. 4 illustrates the variation of deflection angle versus the wedge angle (W°). In one preferred embodiment where the volume 16 is a nematic liquid crystal, such liquid crystals need long optical paths to yield large phase differences. This is because the birefringence ($\Delta n$), which is the difference in refractive index between the extraordinary and the ordinary axis of the liquid crystal, is usually less than 0.2. For materials other than liquid crystals, the birefringence may be greater, i.e., on the order of 0.8. With small phase differences, i.e., path differences, addressing the device becomes faster because the thickness of the liquid crystal is reduced.

In one preferred embodiment, the light beam 12 that is steered is polarized. This allows the amount of deflection to be maximized. The liquid crystal in its "off" state (without any potential difference applied thereto) has a homogeneous/parallel orientation and is birefringent, i.e., its refractive index is different for light polarized along its extraordinary and ordinary axes. To find the polarization which maximizes the amount of deflection caused by the application of a potential difference, the polarization of the light beam 12 is rotated until the deflection angle difference between the "on" and "off" states is maximized. In this embodiment, the light beam 12 will be polarized along the extraordinary axis (largest refractive index) in the "off" state, and along the ordinary axis when the liquid crystal is in the "on" state.

To operate the apparatus 10 according to the invention, an incident light beam 12 is passed through it, entering from the bottom and exiting from the top as shown in FIG. 1. A voltage source 42 is connected to the two transparent conductors 34 and 36 so that a voltage difference is applied across the wedge-shaped volume 16. As the voltage difference provided by the source 42 is increased or decreased in magnitude, the effective refractive index through which the light passes in the electro-optic volume 16 is changed, deflecting the beam away from axis 14 and creating a deflected beam 26. In this way, the deflection angle A is a function simply of the voltage applied to the transparent conductors 34, 36.

For light normally incident on the transmission mode device 10, application of Snell's law yields a $$\emptyset = \sin^{-1}\left[\frac{(n_{LC} + \delta_n)\sin\theta}{n_G}\right] - \theta$$

where $n_{LC}$ and $n_G$ are the refractive indices of the liquid crystal and glass, respectively, $\delta_n$ is the change in effective liquid refractive index, limited by $\Delta n$, the liquid birefringence, and $\theta$ is the angle W of the wedge. For $n_{LC}=n_G=1.5$ and $\Delta n=0.15$, FIG. 3 shows the maximum deflection angle that may be expected for different wedge angles.

The device may be operated in a transmission modes as described above, or in a reflection mode. In reflection mode, one of the two transparent conductors 34, 36 is replaced with a reflective layer such as a metallic layer. The beam then exits on the same side of the device from which it enters, and passes through the liquid crystal material twice. This has the advantage that the deflection angle change is approximately doubled by the double pass through liquid crystal.

FIG. 5 illustrates a reflection mode apparatus 50 according to the invention. This apparatus 50 is essentially the same as the transmission mode apparatus 10 illustrated in FIG. 1 except that the upper transparent conductor 36 of transmission mode apparatus 10 has been replaced by a reflective conductor 52. As a result, an incident beam of Light 54 is reflected by reflective conductor 52 to create a reflected, deflected beam of light 56. In the reflection mode apparatus 50, the beam exits on the same side of the device as it enters and passes through the liquid crystal twice. As a result of this double pass through the liquid crystal, a deflection angle B through which the incident beam is deflected is approximately doubled for the reflection mode apparatus 50 shown in FIG. 5 as compared to a transmission mode apparatus 10 of FIG. 1. For example, in apparatus 50, a 20° wedge would produce a maximum deflection angle of approximately 4.2°. For a wedge angle W of 20°, a wedge having a maximum thickness of 25 microns corresponds to a wedge length of 53.6 microns. A 25 micron thick wedge of angle 15° would have a length of 93.3 microns and a maximum deflection angle of approximately 3.1°. The maximum deflection angle changes for non-normal incidence.

The apparatus according to the invention may be in the form of a single wedge structure as illustrated in FIGS. 1 or 5, or it may be a multiple wedge as shown in FIG. 6. In particular the invention may constitute a structure 30G on which is formed a plurality of contiguous wedge shaped bodies 61 of identical periodicity arranged such that corresponding surfaces 61A are parallel so that the volume 16 is bounded by a plurality of wedge shaped surfaces and a planar surface 61B. The primary advantage of the multiple wedge structure of FIG. 6 is that it covers a larger aperture area and can therefore steer larger diameter incident beams of light. Optimal deflection occurs when the phase difference between the thickest part of one wedge such as at position 62 and the immediately adjacent thinnest part of the next wedge, such as at position 64, is a multiple of $2\pi$. This avoids any destructive interference between the deflection of adjacent wedges. When the phase difference is an odd multiple of $\pi$, the deflective beam is bifurcated into two, each corresponding to allowed diffraction angles, with no deflection at the disallowed angle between them. The number of allowed deflection angles is limited to the number of $2\pi$ cycles through which the thickest part of the wedge may be modulated, which is on the order of 10 for a 25 micron thick liquid crystal. In some cases, this discrete-diffraction angle limitation provides a significant advantage, i.e., deflecting a beam into an array of discrete pixels. To maintain speed and reasonable fields, the optical path is preferably kept short so that the practical implementation is to reset the optical wave front every $2\pi$ or $2n\pi$ as shown in FIG. 6.

A single wedge device can be very small, on the order of 50 microns in each dimension. The small size and simple drive allow the device to be used where size and control are very limited. One application may be as shown in FIG. 7. A wedge device 82 of the invention may be positioned at the end of an optical fiber 84 to steer a beam of light 86 passing through the optical fiber 84. In such a case, the wedge device 82 of the invention can have a diameter which is no larger than the optical fiber 84 itself. For example, the device as illustrated in FIG. 7 may be used in a biomedical application for scanning an image or scanning an internal organ or for steering a laser beam for ablation of a mass.

Different liquid crystals and alignment technologies may be used as the electro-optic volume 16. Parallel nematic liquid crystals can provide large phase depths of up to $100\pi$ or response times on the order of milliseconds. Ferroelectric liquid crystals respond much more quickly, but thus far have not exhibited such large phase depths. In general, the phase depth is the phase delay, measured in radians, caused in the energy as it passes through the liquid crystal and is given by the following formula:

$$\frac{\text{maximum}}{\text{phase depth}} = \frac{\text{thickness of liquid crystal} \times \Delta n \times 2\pi}{\text{wavelength of light in vacuum}}$$

Alternatively, the transparent conductors 34 and 36 may be replaced by a photoconductor such as an amorphous silicon layer. By shining light such as a laser on the silicon layer, the silicon transforms the light energy into a potential difference to alter the orientation of the electro-optic material. To use a photoconductor to replace the reflective conductor 52 in the FIG. 5 embodiment, an additional reflective coating would also be added.

One method of manufacturing the apparatus of the invention is as follows: The two glass substrates 30, 32 in the form of optical flats are placed in a frame with spacers between them to maintain their nonparallel spacing, and wires are connected to the optical flats to condition the molecules of the liquid crystal for responding optically. Optically addressed modulators have two wires for electrical control whereas electrically addressed modulators usually have several more to several hundred wires. In a vacuum, a small portion of the liquid crystal is introduced to the assembly and fills the cavity between the optical flats by capillary action. The whole unit is then heated and cooled under a strict procedure depending on the chemistry of the liquid crystal, as is known in the art, to place the liquid crystal into the correct alignment and phase.

In particular, one method of manufacturing the apparatus 10 of the invention for steering a beam of light in response to a variable potential difference comprises the steps of:

providing the first and second substrates 30, 32; coating a surface of each substrate with one or more selected materials (e.g., nylon) to form alignment layers 38, 40; buffing the coating to create a selected pattern on the alignment layers 38, 40; positioning the substrates 30, 32 so that their alignment layers face each other and so that the substrates define a portion therebetween having a thickness which varies; introducing a liquid crystal material 16 between the supported substrates by capillary action; curing the liquid crystal material; and affixing to the cured liquid crystal material means for applying a variable potential difference across the portion of varying thickness.

The step of coating may comprise making an alignment layer on each coating to align the liquid crystal material by applying a thin layer of nylon to each substrate. For example, to align the molecules, the internal sides of the glass substrates 30, 32 may be coated with a thin layer of nylon. The step of buffing may comprise rubbing the coating with silk to create grooves or notches for receiving molecules of the liquid crystal so that the molecules are uniformly aligned relative to the substrate. The two surfaces of the coated substrates may be rubbed in the same direction to form parallel alignment or may be rubbed in opposite directions to form anti-parallel alignment. The step of supporting may comprise positioning the substrates in a rack non-parallel to each other so that the step of introducing may be conducted in a vacuum whereby the capillary action between the non-parallel substrates forms a wedge of the liquid crystal material.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An apparatus for steering an image comprising a beam of light which defines the image, said apparatus comprising:
   a wedge-shaped volume of electro-optic, light transmissive material positioned to intersect the beam of light so that the beam of light passes through the material, said material having a substantially planar first surface on which the beam of light is incident and a substantially planar second surface opposite to and non-parallel with the first surface, the first and second surfaces defining a wedge such that the material between the first and second surfaces has a thickness which varies;
   a voltage source applying a potential difference across the material, said material having a refractive index which changes as a function of the magnitude of the potential difference applied by the voltage source; and
   a control circuit varying the magnitude of the potential difference applied to the material whereby the beam of light is deflected through a steering angle which is a function of the varying thickness of the material and the refractive index of the material as determined by the magnitude of the potential difference thereby steering the image.

2. The apparatus of claim 1 wherein the second surface of the material is adapted to reflect the beam after transmission through the material so that the beam is transmitted back through the material and emerges from the first surface of the material.

3. The apparatus of claim 2 further comprising a transparent conductor on the first surface coupled to the voltage source and a reflective conductor on the second surface coupled to the voltage source, and wherein the voltage source applies the potential difference between the first and second surfaces via the conductors.

4. The apparatus of claim 1 wherein the second surface of the material is adapted to transmit the beam after transmission through the material so that the beam emerges from the second surface of the material.

5. The apparatus of claim 4 further comprising a transparent conductor on each of the first and second surfaces and coupled to the voltage source, and wherein the voltage source applies the potential difference between the first and second surfaces via the conductors.

6. The apparatus of claim 1 wherein the voltage source comprises a photoconductor on one or both of the first and second surfaces and a light source for illuminating the photoconductor, said illuminated photoconductor applying the potential difference between the first and second surfaces.

7. The apparatus of claim 1 wherein the material comprises a liquid crystal material and further comprising an alignment layer adjacent the first and second surfaces for aligning the molecules of the liquid crystal material to be substantially uniformly oriented relative to the first and second surfaces, respectively, when no potential difference is applied across the liquid crystal material whereby the alignment layer enables proper optical orientation of the liquid crystal material when the potential difference is applied across the liquid crystal material.

8. The apparatus of claim 1 wherein the material comprises a nematic liquid crystal material and further comprising an alignment layer adjacent the first and second surfaces for aligning the molecules of the liquid crystal material to be substantially uniformly parallel to the first and second surfaces, respectively, when no potential difference is applied across the liquid crystal material whereby the alignment layer provides homogeneous alignment which enables proper optical position of the liquid crystal material when the potential difference is applied across the liquid crystal material.

9. The apparatus of claim 1 wherein the wedge-shaped volume of material has sides interconnecting the first and second substantially planar surfaces which define an aperture width and wherein the changes in the refractive index of the material is generally uniform throughout the aperture width.

10. The apparatus of claim 1 further comprising an optical fiber having an end adjacent to the first surface of the material for directing the beam of light into the material.

11. The apparatus of claim 1 wherein the magnitude of the potential difference is varied between an upper level and a lower level, said upper and lower levels corresponding to different angles by which the beam is deflected, and wherein the steering angle is the difference between the different deflection angles.

12. An apparatus for steering a beam of light comprising:

a volume of electro-optic, light transmissive nematic liquid crystal material having a predetermined geometric shape and positioned to intersect the beam of light so that the beam of light is directed into the material, said material having a first surface on which the beam of light is incident and a second surface opposite the first surface, the first and second surfaces defining a portion of the material therebetween having a thickness which varies, the beam of light passing through the portion of the material;

a voltage source applying a potential difference across the portion of the material;

a control circuit varying the magnitude of the potential difference applied to the portion of the material whereby the beam of light is deflected by an angle which is a function of the varying thickness of the portion of the material and the refractive index of the portion of the material as determined by the magnitude of the potential difference; and an alignment layer adjacent the first and second surfaces for aligning the molecules of the liquid crystal material to be substantially uniformly perpendicular to the first and second surfaces, respectively, when no potential difference is applied across the portion of the liquid crystal material whereby the alignment layer provides homeotropic alignment which enables proper optical position of the liquid crystal material when the potential difference is applied across the portion of the liquid crystal material.

13. An apparatus for steering a beam of light comprising:

a volume of electro-optic, light transmissive material comprising a plurality of contiguous wedge-shaped bodies positioned to intersect the beam of light so that the beam of light passes through the material, the wedge-shaped bodies of material having first surfaces on which the beam of light is incident and second surfaces opposite the first surfaces, the first and second surfaces of each wedge-shaped body defining a wedge such that the material between the first and second surfaces has a thickness which varies, the wedge-shaped bodies being arranged such that the second surfaces of the material are parallel so that the volume is bounded by a plurality of contiguous wedge-shaped surfaces and being arranged such that a phase difference between the thickest part of each wedge-shaped body and the contiguous thinnest part of the next wedge-shaped body is a multiple of $2\pi$ whereby destructive interference between adjacent wedge-shaped bodies is minimized;

a voltage source applying a potential difference across the material; and a control circuit varying the magnitude of the potential difference applied to the material whereby the beam of light is deflected by an angle which is a function of the varying thickness of the material and the refractive index of the material as determined by the magnitude of the potential difference thereby steering the beam of light.

14. A method of manufacturing an apparatus for steering an image comprising a beam of light which defines the image in response to a variable potential difference, said method comprising the steps of:

providing first and second substantially planar substrates;

coating a surface of each substrate with one or more selected materials;

positioning the substrates so that their coated surfaces face each other and so that the substrates define a portion therebetween having a thickness which varies;

introducing a liquid crystal material between the positioned substrates;

curing the liquid crystal material; and affixing means for applying a variable potential difference across the portion of varying thickness.

15. The method of claim 14 wherein the step of coating comprises the step of making an alignment layer on each coating to align the liquid crystal material.

16. The method of claim 14 further comprising the step of buffing the coating with silk to create grooves or notches for receiving molecules of the liquid crystal so that the molecules are uniformly aligned relative to the substrate.

17. A method of manufacturing an apparatus for steering a beam of light in response to a variable potential difference, said method comprising the steps of:

providing first and second substrates;

coating a surface of each substrate with one or more selected materials;

positioning the substrates nonparallel to each other so that their coated surfaces face each other and so that the substrates define a portion therebetween having a thickness which varies;

introducing the liquid crystal material between the nonparallel substrates to form a wedge of the liquid crystal material;

curing the liquid crystal material; and affixing means for applying a variable potential difference across the portion of varying thickness.

18. An apparatus for steering an image comprising a beam of light which defines the image, said apparatus for use with a voltage source supplying a varying potential difference, said apparatus comprising:

a wedge-shaped volume of electro-optic, light transmissive material positioned to intersect the beam of light so that the beam of light passes through the material, said material having a substantially planar first surface on which the beam of light is incident and a substantially planar second surface opposite to and non-parallel with the first surface, the first and second surfaces defining a wedge such that the material between the first and second surfaces has a thickness which varies; and means adapted to be connected to the voltage source for applying the varying potential difference across the material, said material having a refractive index which is a function of the magnitude of the potential difference applied by the voltage source whereby the beam of light is deflected through a steering angle which is a function of the varying thickness of the material and the refractive index of the material as determined by the magnitude of the potential difference thereby steering the image.

* * * * *